(12) United States Patent
Gonen et al.

(10) Patent No.: US 12,713,081 B2
(45) Date of Patent: Aug. 18, 2026

(54) CLOUD-BASED VIDEO SPLITTER

(71) Applicant: Synamedia Limited, Maidenhead (GB)

(72) Inventors: Gil Gonen, Jerusalem (IL); Einav Rivini, Beit-Shemesh (IL); Mordechai Regev, Lod (IL); Amotz Terem, Jerusalem (IL); Uziel Joseph Harband, Jerusalem (IL); Avi Fruchter, Neve Daniel (IL)

(73) Assignee: Synamedia Limited, Maidenhead (GB)

( * ) Notice: Subject to any disclaimer, the term of this patent is extended or adjusted under 35 U.S.C. 154(b) by 121 days.

(21) Appl. No.: 18/746,016

(22) Filed: Jun. 17, 2024

(65) Prior Publication Data

US 2025/0386065 A1 Dec. 18, 2025

(51) Int. Cl.
*H04N 21/242* (2011.01)
*H04N 21/2343* (2011.01)
*H04N 21/431* (2011.01)
*H04N 21/433* (2011.01)
*H04N 21/8547* (2011.01)

(52) U.S. Cl.
CPC ....... *H04N 21/242* (2013.01); *H04N 21/2343* (2013.01); *H04N 21/4312* (2013.01); *H04N 21/4331* (2013.01); *H04N 21/8547* (2013.01)

(58) Field of Classification Search
None
See application file for complete search history.

(56) References Cited

U.S. PATENT DOCUMENTS

2020/0015121 A1* 1/2020 Misra .................... H04L 65/752
2021/0093962 A1 4/2021 Colenbrander et al.
2021/0294558 A1* 9/2021 Griffin .................... H04L 69/28
2023/0164399 A1* 5/2023 Chasalow ........... H04N 21/238 370/312

OTHER PUBLICATIONS

Extended European Search Report for corresponding European Appl. No. 25178044.1 dated Sep. 22, 2025, 9 pages.

* cited by examiner

*Primary Examiner* — James R Marandi
(74) *Attorney, Agent, or Firm* — Fernando & Partners, LLP

(57) ABSTRACT

Techniques for cloud-based video splitting are described herein. In various embodiments, at least one server hosting a cloud-based video splitter renders one or more user interfaces for a plurality of client devices connected to a plurality of displays. The cloud-based video splitter divides each frame of a video corresponding to the one or more user interfaces into a plurality of portions and encodes the plurality of portions into a plurality of videos according to properties of the plurality of displays and characteristics of the plurality of client devices. The cloud-based video splitter also streams the plurality of videos to the plurality of client devices for synchronized presentation on the plurality of displays.

19 Claims, 6 Drawing Sheets

200 video audio

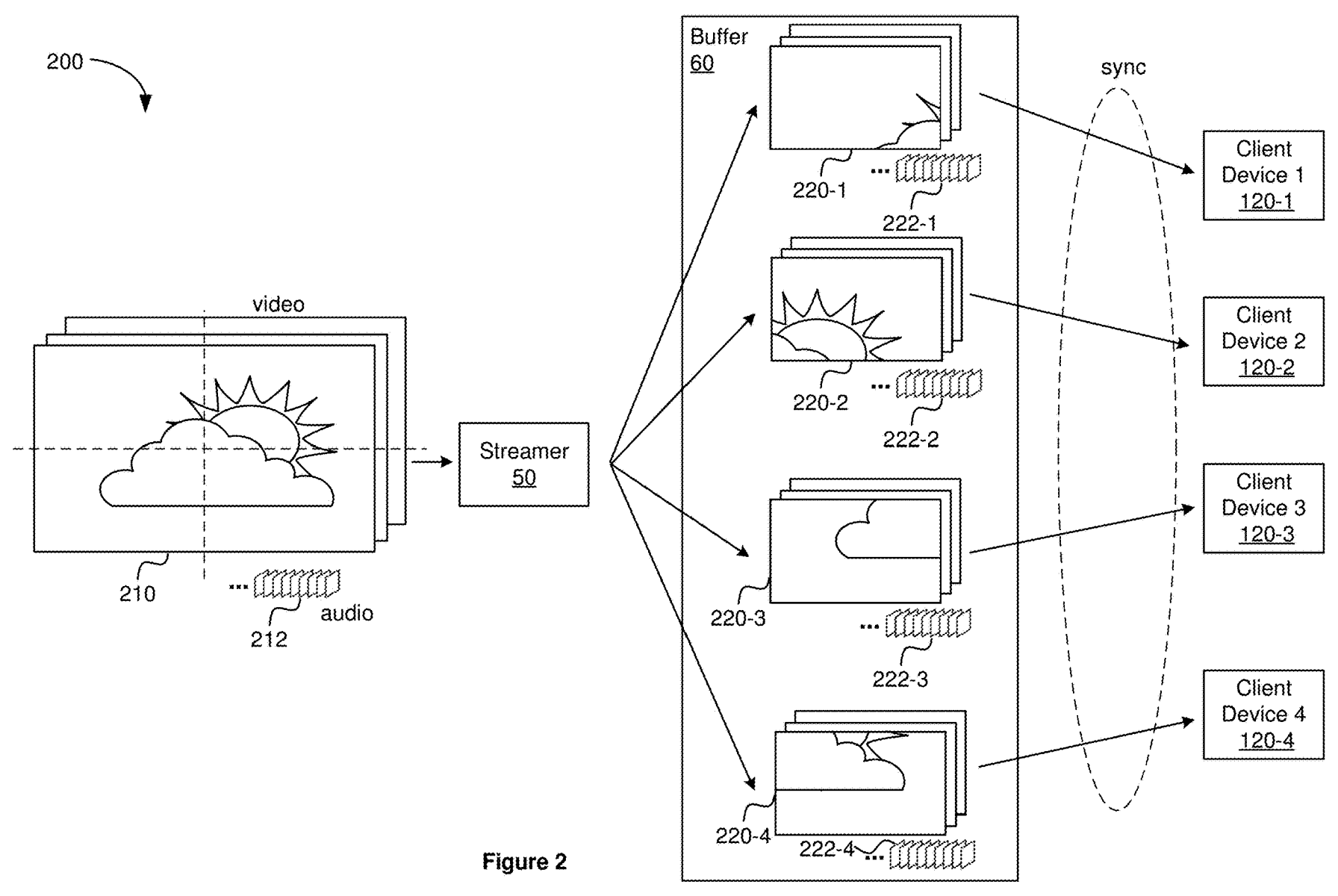

212

210

Streamer
50

Buffer
60

220-1
222-1
220-2
222-2
220-3
222-3
220-4
222-4 sync

Client Device 1
120-1

Client Device 2
120-2

Client Device 3
120-3

Client Device 4
120-4

Figure 2

CLOUD-BASED VIDEO SPLITTER

TECHNICAL FIELD

The present disclosure relates generally to multimedia content delivery and, more specifically, to a cloud-based video splitter for delivering multimedia content to large presentations.

BACKGROUND

A thin client typically has very limited resources to render graphics. For optimal performance, some previously existing systems render graphics for thin client devices on a secondary device, e.g., a cloud television (TV) user interface (UI) rendering platform. In such systems, the cloud renders UIs and delivers rendered videos to thin clients for decoding and display. Real time content delivery protocols, such as Web Real-Time Communication (WebRTC) and/or Real-Time Protocol (RTP), are often used for low latency content delivery to thin clients.

For large presentations over multiple displays, e.g., a single large image spread over multiple TVs in a grid arrangement, the conventional approach involves having a single or a main end receiver (e.g., a set-top-box (STB) or a computing device) on the client side, which receives the video stream, and connecting a client-side video splitter to the receiver. The client-side video splitter then divides the images for multiple displays arranged side-by-side. Some previously existing methods additionally enable each display to crop and resize its relative quadrant. Such solutions pose several issues, particularly for cloud TV UI rendering platforms, where a typical configuration is to connect a single decoding device to a display, e.g., one STB connected to a single TV.

First, video quality is limited to the highest quality among the client devices, e.g., the main end receiver. In other words, the highest quality of the video remains that of the single stream being decoded at the main end receiver. For instance, if the main end receiver is of high-definition (HD) quality, the overall video will be in HD with each display presenting ¼ of the HD quality. Second, network traffic is increased significantly because the entire video is transmitted to each display, resulting in four times the network traffic compared to a single display. Third, greater graphic processing capabilities are for cropping and resizing, which may exceed the capabilities of thin client devices. Fourth, once the setup is complete, dynamically modifying the static configuration of multiple displays forming one large video becomes challenging. For example, toggling between rendering a single large video on all screens and having each screen run separate applications is difficult. Lastly, in typical low latency content delivery, the priority is to achieve real time performance. However, managing different lags, such as skipping frames on one display to synchronize with others in real time, becomes complicated when the displays are in different locations with different network conditions.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIG. 2 is a diagram illustrating cloud-based video splitting into four quadrants, in accordance with some embodiments;

Figure 1:
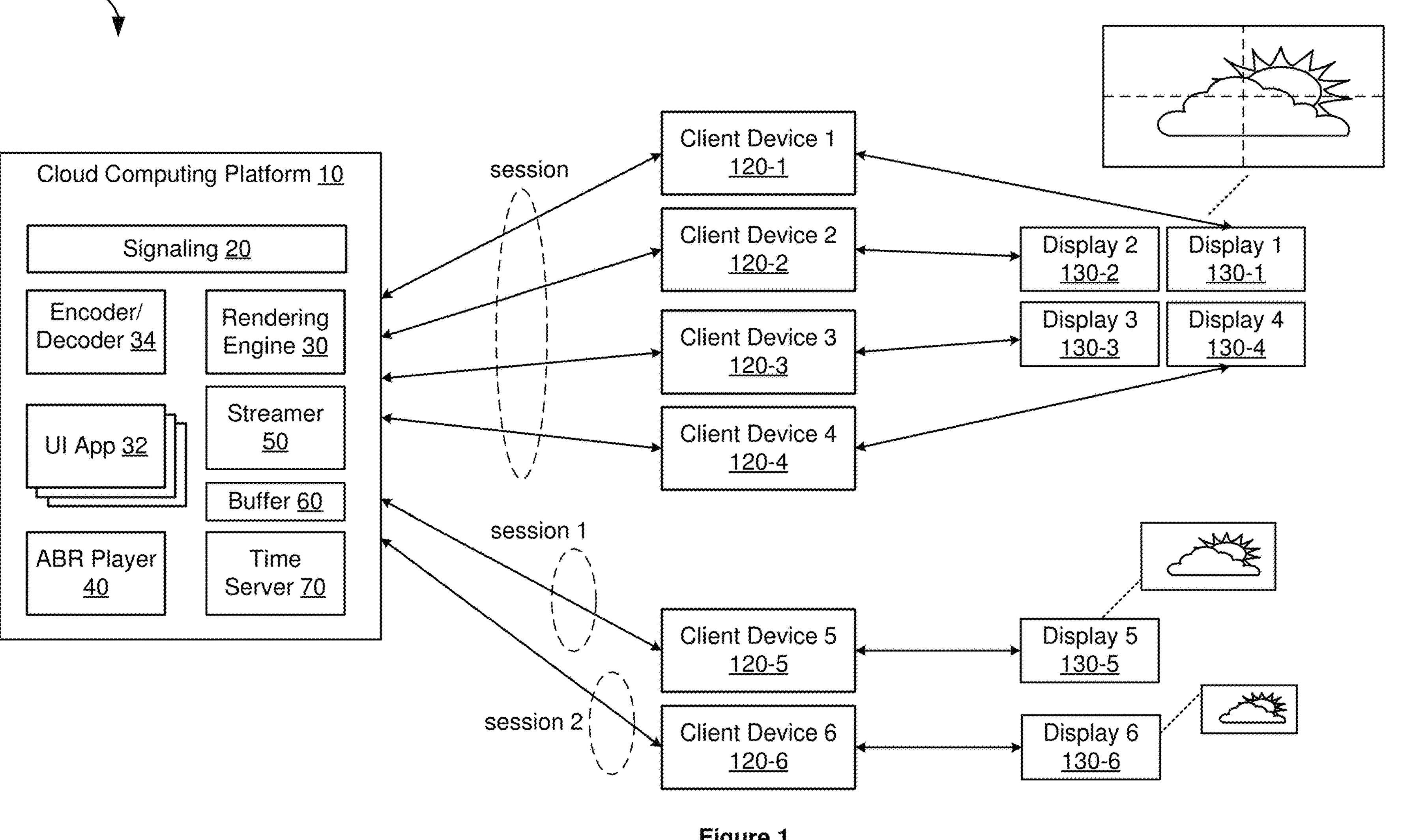
FIG. 1 is a block diagram illustrating an exemplary multimedia content delivery system that provides a cloud-based video splitter, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

OVERVIEW

A cloud platform disclosed herein provides a cloud-based video splitter, enabling content delivery for large presentations across multiple displays connected to multiple thin client devices. In some embodiments, a cloud platform hosting the cloud-based video splitter includes a pool of engines for running video rendering applications and a streamer for splitting the rendered videos for client devices. For example, the pool of engines can be a pool of user interface (UI) engines for television (TV) user interface rendering, and the streamer can be a UI streamer for splitting the rendered UIs for client devices. In some embodiments, each frame of the rendered videos is divided into multiple portions with varying display characteristics, each for a corresponding client device. To ensure consistent visualization across the multiple displays, the system described herein synchronizes content delivery and/or display in accordance with various embodiments. Accordingly, the cloud platform described herein dynamically and efficiently splits videos in the cloud for low cost client devices.

In accordance with various embodiments, a cloud-based video splitting method is performed at a server that includes one or more processors and non-transitory memory, e.g., at least one server hosting a cloud computing platform. The cloud-based video splitter renders one or more user interfaces for a plurality of client devices connected to a plurality of displays. The cloud-based video splitter also divides each frame of a video corresponding to the one or more user interfaces into a plurality of portions and encoding the plurality of portions into a plurality of videos according to properties of the plurality of displays and characteristics of the plurality of client devices. The cloud-based video splitter additionally streams the plurality of videos to the plurality of client devices for synchronized presentation on the plurality of displays.

EXAMPLE EMBODIMENTS

Methods, devices, and systems described herein render videos in the cloud, process the rendered videos using a streamer, and encode the videos to a low latency output (e.g., according to Web Real-Time Communication (WebRTC) protocol) for clients participating in large presentations, e.g., an array or a group of displays or televisions (TVs) forming a large screen. In some embodiments, the streamer receives an encoded user interface (UI), e.g., a UI video, a UI image, or a UI image with an embedded video, splits it into multiple tracks, each for a portion (e.g., a quadrant) of a large screen, and encodes each track with the same time for decoding and/or presentation. The source UI can be of higher quality than any of the given displays and client devices. This allows high quality display on multiple screens without degradation of quality, even though each is limited to a sub-quality. In such embodiments, the streamer processes the large frames of the rendered UI, crops and/or splits the large frames for the desired number of clients participating in the large display, and then encodes each of the outputs as a dedicated stream to a specific client. For example, with a grid of 2×2 clients and each capable of displaying high definition (HD) resolution (e.g., 1920×1080), the streamer can output 4K resolution (e.g., 3840×2160) that is split to four quadrants and each is full HD (e.g., 1920×1080).

The systems described herein have the ability to dynamically signal a dedicated streamer to manage each device or join for a large session of one UI split on multiple devices. In some embodiments, each stream is managed independently by each client to allow them to choose the best quality based on the network and/or bitrate of the individual client. In such embodiments, each end receiving device decodes the best bitrate it can handle regardless and independent of other end receiving devices. As such, some displays may differ in the quality than others. In some other embodiments, the streamer synchronizes the streaming globally to ensure clients participating in the large presentation receive the same bitrate to ensure consistency, e.g., choosing the bitrate of the client with the worst connectivity. In addition to configuring streaming quality for multiple client devices, the systems described herein also synchronize the streaming for consistency across multiple displays.

In typical low latency streaming, the focus is to be as real time as possible. When the displays are in different areas, various methods can be applied to manage the lags, e.g., skipping frames on one display to catch up to others. When multiple displays are collocated, it is important to keep consistent visualization and experience to handle synchronization as well as interruptions. In some embodiments, the streamer uses the same time stamp for each of the video tracks when generating the WebRTC tracks for each of the videos. In some embodiments, the clients synchronize internal clocks (e.g., using Network Time Protocol (NTP)) so that frames in each video stream are delivered, decoded, and/or presented at the same time. The methods, devices, and systems described herein thus expand the capability of thin devices and improve user experience. The systems can also be used to split the same video into multiple outputs (e.g., without any split) and duplicate the audio to multiple client devices.

Reference is now made to FIG. 1, which is a block diagram of an exemplary multimedia content delivery system 100 that provides a cloud-based video splitter in accordance with some embodiments. The multimedia content (also referred to hereinafter as "media content", "media content item(s)", "media asset", or "content") can include any multimedia data, such as visual data, audio data, and/or text, etc. In some embodiments, the content delivery system 100 includes a cloud computing platform 10 on the server side for providing media content and a client side for playing the media content. In some embodiments, the multimedia content delivered by the cloud computing platform 10 includes adaptive bitrate (ABR) videos (also known as "buffered content") and/or low latency user interface (UI) videos (also known as "low latency content", "UI videos", "application video streams", "or application videos"). To prepare the media content, the cloud computing platform 10 can apply any number of video/audio packaging techniques following any standards, such as H.264, Opus, Advanced Video Coding (AVC), or the High Efficiency Video Coding (HEVC) standard, Dynamic Adaptive Streaming over HTTP (DASH), and/or HTTP Live Streaming (HLS), etc.

In some embodiments, the cloud computing platform 10 includes a signaling unit 20 for establishing connection(s) and/or session(s) with a plurality of client devices 120 (e.g., client device 1 120-1, client device 2 120-2, client device 3 120-3, client device 4 120-4, client device 5 120-5, and client device 6 120-6, etc.) on the client side. Through the established connection(s), commands, configurations, messages, user inputs, application controls, media content, states, display properties, locations, audio output device configurations, event notifications, and/or licenses are exchanged between the server side and the client side. In some embodiments, the connection(s) and/or session(s) established with the client devices 120 are through channels different from the channels transmitting the videos. For example, when using WebRTC as the communication protocol, the signaling unit 20 facilitates the establishment of a WebRTC data channel as an additional channel to the audio and video channels between the cloud computing platform 10 and a respective client device 120. The data channel allows for bidirectional communication of data between the cloud computing platform 10 and the respective client device 120, e.g., the cloud computing platform 10 receiving inputs, states, and display properties, etc. and sending configurations, messages, and application controls, etc.

In some embodiments, each of the plurality of client devices 120 is connected to a respective display device 130, e.g., client device 1 120-1 coupled with display 1 130-1, client device 2 120-2 coupled with display 2 130-2, client device 3 120-3 coupled with display 3 130-3, and client device 4 120-4 coupled with display 4 130-4, client device 5 120-5 coupled with display 5 130-5, and client device 6 coupled with display 6 130-6, etc. Through the connections between a respective client device 120 and a corresponding display 130, display properties of the display 130 (e.g., resolution, dimension of the display 130) and content for display are exchanged. In some embodiments, a respective client device 120 is a set-top-box (STB) or any computing device that is capable of decoding and playing videos outputted to a respective display 130. Further, though FIG. 1 illustrates a respective client device 120 being separate and distinct from a respective display 130, in some embodiments, a respective client device 120 is combined with a respective display 130, e.g., a smart TV and/or a computing device with a display.

In some embodiments, a rendering engine 30 on the cloud computing platform 10 receives user inputs from the client side and communicates with the client side using a low latency data transport mechanism, e.g., using WebRTC, Real-time Transport Protocol (RTP), and/or other low latency content delivery protocol(s). In some embodiments, the rendering engine 30 utilize the low latency communication channel between the cloud computing platform 10 and the client side to deliver low latency content, such as UI videos. In some embodiments, the user inputs include pressing a button, voice inputs to a voice recorder, and/or user inputs detected by a sensor, etc. In some embodiments, in addition to communicating the user inputs and the low latency content, the low latency data transport connection (e.g., the WebRTC data channel) is also used for communicating application controls (e.g., switch points and switch policies), client feedback, client states (e.g., statistical data indicating client bandwidth, buffer status, processing capacity, and/or storage capacity, etc.), encryption events (e.g., license requests), and/or content decryption licenses, etc.

In some embodiments, the rendering engine 30 and/or a UI application 32 render requested UIs into UI video segments and/or frames and facilitate the transmission of UI videos (i.e., low latency content) to the client side over the low latency connection. In some embodiments, an ABR player 40 obtains and plays ABR videos to the rendering engine 30 for UI rendering. In some embodiments, when composing UI videos that include ABR content, e.g., an overlay of the positional information on top of a movie, an encoder/decoder 34 re-encodes and/or re-encrypts the ABR content for the UI composition and/or rendering. In some embodiments, the encoder/decoder 34 also encodes the rendered UIs into low latency content for streaming. As used herein, the UIs rendered by the rendering engine 30 and/or the UI application 32 are graphical user interfaces that allow users to interact with through graphical elements such as affordances and/or visual indicators. The UIs can include a video, an image, a UI image with an embedded video, or an image overlaid on a video. Once rendered, the UIs can be encoded into low latency videos for streaming to the client side.

In some embodiments, a streamer 50 on the cloud computing platform 10 obtains the rendered and/or encoded UIs and/or ABR videos and splits the videos for the plurality of client devices 120. For example, FIG. 2 is a diagram 200 illustrating video splitting, where each of the client device 120 receives a portion of the content for a large presentation, e.g., ¼ of the large presentation, and decodes the portion for the display 130 (FIG. 1). In such configuration, the stream 50 splits each frame of a video stream 210 into quadrants and encodes each quadrant into a respective video stream 220, e.g., the video stream 220-1 having the top left quadrant, the video stream 220-2 having the top right quadrant, the video stream 220-3 having the bottom left quadrant, and the video stream 220-4 having the bottom right quadrant. Each of the video streams 220 is then transmitted to a respective client device 120 for display at a corresponding display 130 (FIG. 1). Also shown in FIG. 2, in some embodiments, an audio stream 212 associated with the video stream 210 is duplicated into four audio streams 222-1, 222-2, 222-3, and 222-4, and the audio streams 222 are sent to the client devices 120 along with the corresponding videos 220. In some embodiments, instead of duplicating the audio stream 212 for each of the client devices 120, the streamer 50 sends the audio stream 212 to a subset of the client devices 120, e.g., sending to one of the client devices 120 that is connected to a display with the best audio output property or connected to the main end receiving device or sending to two of the client devices 120 that are not co-located.

Still referring to FIG. 1, in some embodiments, the cloud computing platform 10 includes a buffer 60 that stores the output from the streamer 50. In some embodiments, the cloud computing platform 10 also includes a time server 70 to facilitate synchronized display. In some embodiments, the streamer 50 utilizes the buffer 60 and/or the time server 70 for synchronizing the videos to the plurality of client devices 130 in a large presentation. For instance, in FIG. 2, because the encoding of each quadrant can differ in time, the streamer 50 can store the videos 220 in the buffer 60 and/or delay the transmission of the videos 220 so that they are transmitted at the same time. As such, all portions of a respective frame 210 are sent to the client devices 120 at the same time. In some embodiments, during the encoding of each quadrant, the streamer 50 and/or the encoder 34 (FIG. 1) synchronize timestamps of corresponding frames in the videos 220, e.g., setting the same PTS and/or DTS for the first frame in the videos 220-1, 220-2, 220-3, and 220-4 so that the quadrants forming the large image of the sun and the cloud are presented at the same time on the client side.

Also as shown in FIG. 2, in some embodiments, in addition to synchronizing the transmission of the videos 220, the streamer 50 also synchronizes the transmission of the audio streams 222, e.g., synchronizing the configuration of timestamps of the audio streams 222 and/or transmitting the audio streams 222 at the same time. In some embodiments, the decoding of the videos 220 at the client devices 120 is aligned with the audio streams, e.g., aligning video frames in the video streams 220 with corresponding audio frames in the audio streams 222. In such embodiments, the synchronized display of the videos 220 is improved because segments in the audio streams 222 are smaller and the arrivals of the synchronized audio streams 222 to the client devices 120 are closer in time.

In some embodiments, instead of or in addition to using audio packets for synchronization, other types of blocks, frames, segments, packets, tracks, and/or streams that are transmitted with the videos 220 can be used to facilitate synchronization, e.g., subtitle tracks. For example, broadcasters typically broadcast satellite content in a transport stream container format. On the receiving end, different generations of STBs use a variety of audio and video streaming formats to receive a broadcast stream and use a demultiplexer to demultiplex the broadcast stream into a plurality of component elementary streams, e.g., an audio elementary stream(ES), a video TS, and/or an ES for carrying timed text (referred to hereinafter as the “timed text ES”, “text ES”, or “text stream”). Examples of the timed text ES include, but not limited to, an ES for carrying timed text, teletext, closed captions, and/or subtitles that match the accompanying video and/or audio content. In some embodiments, to demultiplex the broadcast stream, the demultiplexer utilizes a tuner, a plurality of packet identifier (PID) and elementary stream filters, and/or a re-multiplexer to capture various types of packets. For example, the demultiplexer includes a PID and ES filter to demultiplex the audio portion, e.g., by buffering an audio packetized elementary stream (PES) in an audio buffer, and includes another PID and ES filter to demultiplex the timed text portion, e.g., by buffering a PES in a timed text buffer. In some embodiments, the demultiplexer utilizes the re-multiplexer to capture video packets. Routinely, a satellite broadcaster broadcasts video, audio, and/or timed text packets ahead of their scheduled decoding and/or presentation time. The amount by which such video/audio packets are ahead varies. The variation results in a fluctuating temporal buffer of video/audio packets. The fluctuating temporal buffer allows the broadcaster to handle a sudden change (e.g., a sudden run of scene changes) without a noticeable drop in quality. To compensate for the variable offset between the transmission time of video frames and audio frames, in some embodiments, the demultiplexer demultiplexes the broadcast stream so that components in the component elementary streams can be aligned based on the corresponding PTS and/or DTS of the audio, video, and/or text content.

Referring back to FIG. 1, in some embodiments, the streamer 50 performs synchronization across multiple sessions. In some embodiments, the signaling unit 20 establishes a large session for the plurality of client devices 120 participating in a large presentation. For example, in FIG. 1, the signaling unit 20 joins client device 1 120-1, client device 2 120-2, client device 3 120-3, and client device 4 120-4 into a large viewing session, where one instance of the UI application 32, one rendering engine 30, and/or one streamer 50 are allocated to facilitate the content delivery to four client devices 120-1, 120-2, 120-3, and 120-4. In such embodiments, the streamer 50 synchronizes the transmission of the quadrant videos to the client devices 120-1, 120-2, 120-3, and 120-4 within the same session. In some other embodiments, the signaling unit 20 dynamically establishes separate sessions for each of client devices 5 120-5 and client device 6 120-6 and allocates one instance of the UI application 32, one rendering engine 30, and/or one streamer 50 for each session, e.g., session 1 for client device 5 120-5 and session 2 for client device 6 120-6. In such embodiments, the streamer 50 synchronizes the transmission of the videos to the client devices 120-1 and 120-2 across multiple sessions, e.g., session 1 and session 2.

As shown in FIG. 1, the cloud-based video splitter provided by the cloud computing platform 10 can dynamically split videos for large presentations over various numbers of displays. For example, in the case of a large presentation over display 1 130-1, display 2 130-2, display 3 130-3, and display 4 130-4, the streamer 50 can split each video frame into four quadrants. In another example, e.g., a scenario of watching together, the streamer 50 delivers the same content to multiple client devices 120-5 and 120-6 without splitting each frame. In such embodiments, even if the client devices 120-5 and 120-6 are located in different locations, the synchronization of the content delivery ensures that the duplicated content displayed on the multiple displays 130-5 and 130-6 remains synchronized but can be of different qualities, e.g., different sizes, orientations, dimensions, resolutions, bitrates, etc. In yet example, as will be described in further detail with reference to FIG. 4, a large presentation can be displayed over nine displays and the content being displayed on each of the displays can be encoded according to different display properties, e.g., different resolution and/or bitrates.

It should be noted that although a single rendering engine 30, a single encoder/decoder 34, a single ABR player 40, a single streamer 50, a single buffer 60, and a single time server 70 are illustrated in FIG. 1, the system 100 may include one or more instances of such components, e.g., pool(s) of rendering engines 30 for providing UIs and/or multiple instances of streamer 50 for splitting videos. For the sake of simplicity, the subject matter will be described hereinafter for the most part with reference to a single rendering engine 30, a single encoder/decoder 34, a single ABR player 40, a single streamer 50, a single buffer 60, and a single time server 70.

Further, one or more components and/or functions of the components illustrated in FIG. 1 may be distributed and/or re-arranged. For example, the buffer 60 can be a part of the streamer 50 or as a separate component. As such, the server side of the content delivery system 100 can include more, less, and/or different elements than shown in FIG. 1. Each of the component in the content delivery system 100 can include appropriate hardware, software, and/or firmware to perform the operations attributed to the element herein. Operation(s) attributed to an element in the content delivery system 100 herein should not be considered binding and in some embodiments, other element(s) in the exemplary system 100 may additionally or alternatively perform such operation(s). For instance, as described below with reference to FIG. 3, the time server 70 can be part of the cloud computing platform 10, a different system on a different computing device, or on a node in a network communicatively connected to the cloud computing platform 10.

Figure 3:
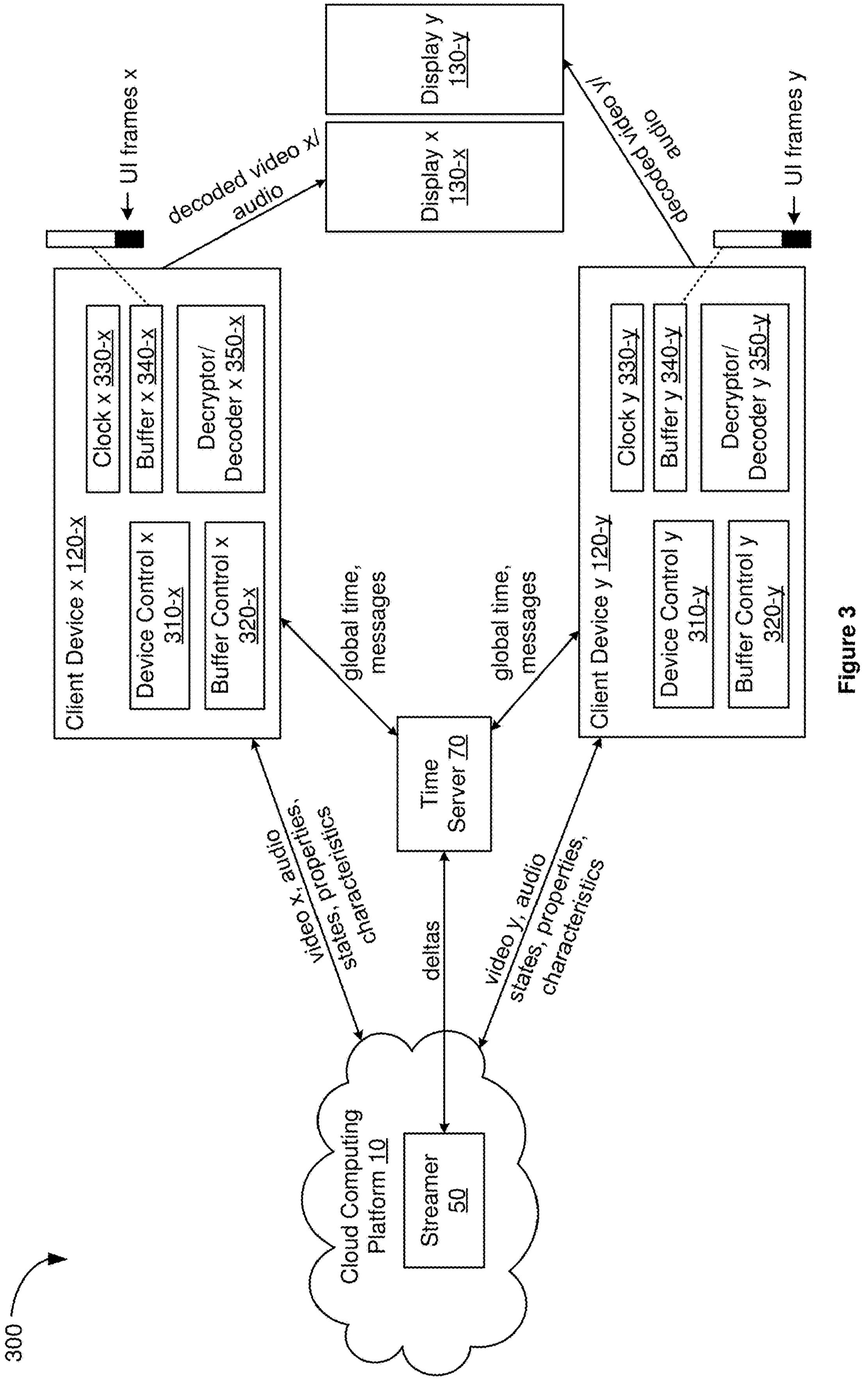
FIG. 3 is a diagram illustrating client configurations for synchronized display, in accordance with some embodiments.

FIG. 3 is a diagram 300 illustrating configurations for synchronized display on the client side in accordance with various embodiments. In some embodiments, each of the exemplary client devices 120-*x* and 120-*y* (also collectively referred to hereinafter as the client devices 120) includes a device control unit 310 (e.g., the device control unit 310-*x* for client device x 120-*x* and the device control unit 310-*y* for client device y 120-*y*) for negotiating and maintaining connections with the signaling unit 20 (FIG. 1), a buffer control unit 320 (e.g., the buffer control unit 320-*x* for client device x 120-*x* and the buffer control unit 320-*y* for client device y 120-*y*) for configuring a buffer 340 (e.g., the buffer 340-*x* for client device x 120-*x* and the buffer 340-*y* for client device y 120-*y*), a decryptor/decoder 350 (e.g., the decryptor/decoder 350-*x* for client device x 120-*x* and the decryptor/decoder 350-*y* for client device y 120-*y*) for decrypting and/or decoding the content from the buffer 340 for the corresponding display 130, e.g., the decryptor/decoder x 350-*x* for outputting the decoded and decrypted audio and video content to the display x 130-*x* and the decryptor/decoder y 350-*y* for outputting the decoded and decrypted audio and video content to the display y 130-*y*.

As described above with reference to FIG. 1, in some embodiments, utilizing a channel between the client device 120 and the cloud computing platform 10, e.g., a data channel established over a WebRTC connection, the client device 120 sends client conditions and display properties to the cloud computing platform 10 and receives commands, configurations, application controls, policies, low latency and ABR content switching point, and/or low latency content (e.g., UI videos and audios) from the cloud computing platform 10. UI videos are typically delivered over a low latency protocol, e.g., for near real time content delivery, while ABR videos are typically buffered content, e.g., with a deeper buffer depth for ABR packet retries, and delivered using different protocol(s) and/or through different channel(s) from low latency content. In some embodiments, the buffer control unit 320 manipulates pointers in the buffer 340 according to switch points and/or switch policies specified by the cloud computing platform 10 to ensure continued content playout whether the content is UI videos or ABR videos. In some embodiments, the buffer control unit 320 obtains the status of the buffer 340, such as current playout position, next available boundaries, buffer depth, etc., and reports the status to the cloud computing platform 10. In some embodiments, the cloud computing platform 10 then uses such information to determine buffer configurations and sends the buffer configurations to the client device 120.

For example, to configure client device x 120-*x* and client device y 120-*y* for real time video playback with low latency, the cloud computing platform 10 can configure, via the buffer control units 320-*x* and 320-*y*, the same amounts of small buffering to store UI frames x and y in the buffers 340-*x* and 340-*y*, e.g., less than a threshold or not having any buffering for UI frames. The small buffering for the UI frames enables the client devices 120-*x* and 120-*y* to display the UI frames as soon as they are downloaded, decoded, and/or decrypted. When the streamer 50 sends the UI frames in video stream x and video stream y to the client devices 120-*x* and 120-*y* at the same time as illustrated and described with reference to FIG. 2, the small buffering ensures that the client devices 120-*x* and 120-*y* send a frame to the displays 130-*x* and 130-*y* at the same time based on timestamps, e.g., the presentation timestamp (PTS) and/or decoding timestamp (DTS). In other words, the synchronized transmission of the video streams x and y causes the client devices 120-*x* and 120-*y* to send a respective frame from the video streams x and y to the displays 130-*x* and 130-*y* at the same time.

In some embodiments, based on the received buffer status, the cloud computing platform 10 sends messages to the client devices 120-*x* and 120-*y* to align to a particular frame, e.g., to freeze on a specific frame or to skip a frame until the client devices 120-*x* and 120-*y* for the large presentation complete downloading frames to the buffers 340-*x* and 340-*y* and then instructs the client devices 120-*x* and 120-*y* to continue or resume the playout and/or presentation from a particular frame onwards. The brief freeze and/or skipping allow the client devices 120-*x* and 120-*y* to synchronize the display from the same position.

In some embodiments, each of the client devices 120-*x* and 120-*y* also includes a clock 330 (e.g., clock x 330-*x* on client device x 120-*x* and clock y 330-*y* on client device y 120-*y*). In addition to or in conjunction with configuring the buffers 340, a global time correlating to a frame is synchronized for each of the client devices 120-*x* and 120-*y*. To synchronize the clocks 330-*x* and 330*y*, in some embodiments, the client devices 120-*x* and 120-*y*, upon receiving the first frame of the video and/audio data from the cloud computing platform 10 for the large presentation, obtain the global time from the time server 70. The global time is then used by the client devices 120-*x* and 120-*y* to synchronize the clocks 330-*x* and 330-*y*. In some embodiments, the client devices 120-*x* and 120-*y* also periodically obtain the global time from the time server 70 via protocols such as the Network Time Protocol (NTP) for synchronizing the clocks 330. Using NTP, the time server 70 adjusts the system clocks 330-*x* and 330-*y* based on periodic time synchronization requests from the client devices 120 to minimize clock drift and maintain accurate timekeeping. The synchronized clocks 330-*x* and 330-*y* thus ensure synchronized presentation and/or decoding of video and audio data at the client devices 120-*x* and 120-*y*. In some embodiments, the client devices 120-*x* and 120-*y* configure the refresh rate clocks of the displays 130-*x* and 130-*y* to help synchronize the actual display of the frames from the decoded videos x and y on the displays 130.

As described above with reference to FIG. 1, the time server 70 can be located in the cloud as shown in FIG. 1 or outside the cloud computing platform 10 as shown in FIG. 3. For instance, the time server 70 can be located within a network that has low and consistent network latency to the client devices 120, e.g., on the same LAN with the client devices 120, on one of the client devices 120 being elected, or in the cloud if the network latency to the client devices 120 are approximately the same. In various embodiments, the time server 70 provides the global time for synchronizing the clocks 330 and/or acts as a synchronizer to facilitate the presentation of frames.

In some embodiments, the client devices 120 periodically send to the time server 70 messages indicating the current frames being presented, e.g., sending the PTS of the frames being presented according to a schedule set using the clocks 330. In response, the time server 70 determines any deltas of the PTS among the client devices 120. When the frames at the client devices 120 are in sync, the deltas are less than a predetermined threshold. On the other hand, when the frames at the client devices 120 are out of sync, e.g., the deltas are greater than a predetermined threshold, the time server 70 notifies the cloud computing plat 10, e.g., sending messages indicating the deltas among the client devices 120.

In response to receiving the reports, in some embodiments, the cloud computing platform 10 (e.g., the streamer 50, the rendering engine 30 (FIG. 1), and/or the encoder 34 (FIG. 1)) modifies the PTS of the frames following a particular frame, e.g., setting a larger time gap between the subsequent frames and the particular frame. The changes to the PTS cause the client devices 120-*x* and 120-*y* to delay the presentation of the subsequent frames to re-align with each other. Adjusting the PTS thus allows the cloud computing platform 10 to control when each client device 120 presents the frames and synchronize the presentation of frames. In some embodiments, instead of having the cloud computing platform 10 adjust the PTS, the cloud computing platform 10, upon determining that the frames at the client devices 120 are out of sync, the time server 70 sends the deltas to the client devices 120-*x* and 120-*y*. Upon receiving the deltas, the client devices 120-*x* and 120-*y* apply the deltas to the frames so that the playout of the frames can be delayed, skipped, slowed down, or sped up. For example, once the time server 70 determines that the PTS of a frame being displayed at client device x 120-*x* is 40 ms behind the corresponding frame being displayed at client device y 120-*y*, the PTS of subsequent frames to be displayed at client device 120-*x* is added by 40 ms, e.g., being configured by the cloud computing platform 10 and/or applied by client device x 120-*x*.

As shown in FIG. 3, the systems described herein use various methods to synchronize the display of frames in large presentations for improved user experience. On the server side, the cloud computing platform 10 configures the buffers 340 to be the same depth and sends the video and audio streams to the client devices 120 at the same time. On the client side, in some embodiments, the client devices 120 utilize the time server 70 to synchronize the clocks according to a global time. The periodic clock synchronization ensures synchronized presentation and/or decoding of video and audio data at the client devices 120. On the client side, in some embodiments, the client devices 120 periodically report the presentation timestamps of the frames being presented at the displays 130 to the time server 70. In such embodiments, the time server 70 obtains the deltas and aligns subsequent frames for synchronized display of the subsequent frames. In some embodiments, the adjustments include, but are not limited to, modifying the PTS or other timestamps of the frames, adjusting the frame delivery rate, instructing the client devices 120 to delay, skip, slow down, or speed up the presentation, etc. Also on the client side, in some embodiments, to prevent screen tearing without requiring a dedicated hardware module or a specialized GPU feature, each of the client devices 120 is configured to synchronize the frame rate of the video output with the refresh rate of the respective display 130. In such embodiments, the respective client device 120 waits for the corresponding display 130 to signal that the display 130 has completed drawing the current frame (e.g., via a vertical blanking interval) before sending the next frame.

Figure 4:
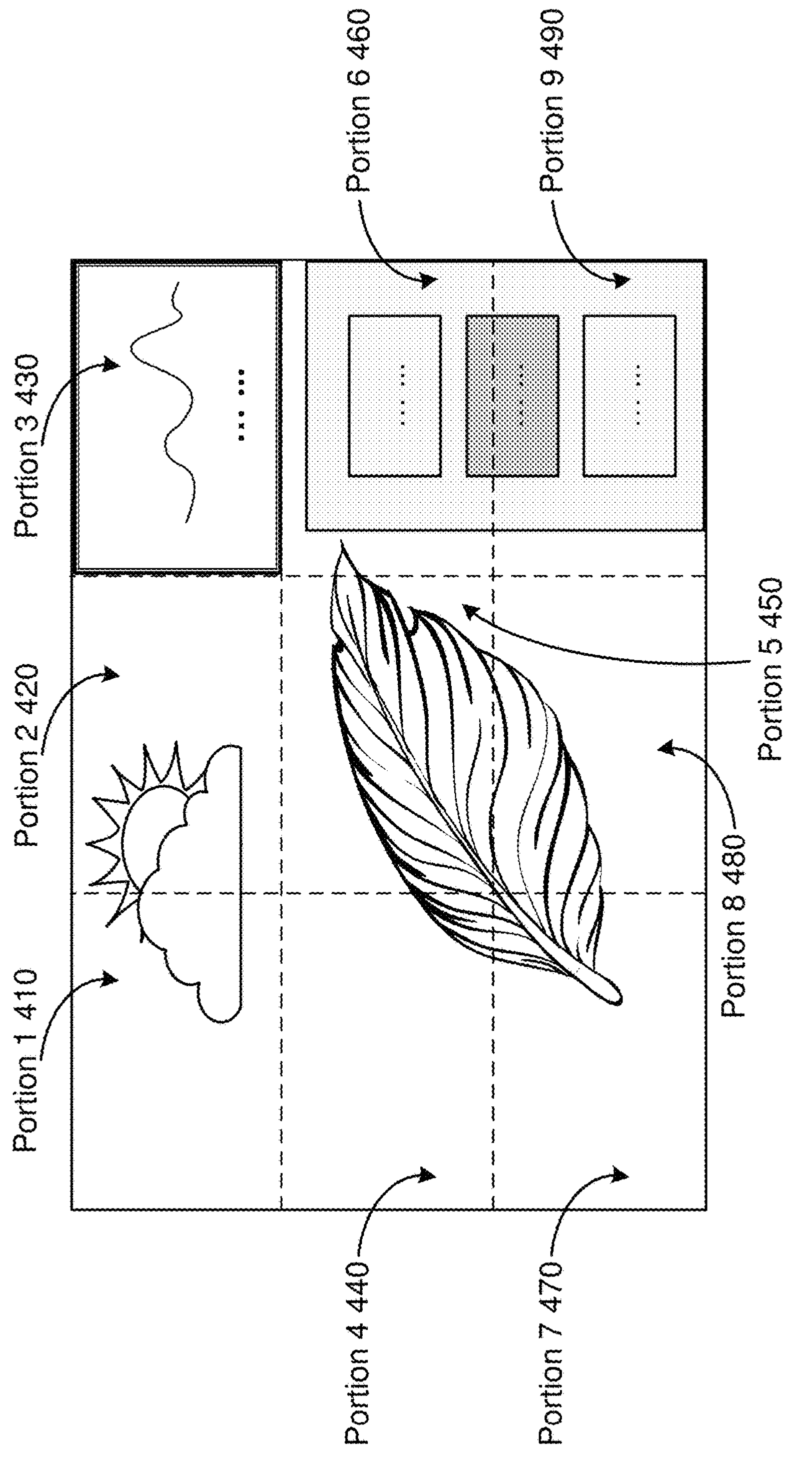
FIG. 4 is a diagram illustrating an exemplary large presentation over nine displays, in accordance with some embodiments.

FIG. 4 is diagram 400 illustrating an exemplary large presentation over nine displays in accordance with some embodiments. As described above with reference to FIG. 1, in some embodiments, each video stream is managed independently for each client device to allow different bitrates for the best quality. In some embodiments, the streamer 50 (FIG. 1) divides each frame into multiple portions, e.g., portion 1 410, portion 2 420, portion 3 430, portion 4 440, portion 5 450, portion 6 460, portion 7 470, portion 8 480, and portion 9 490. In some embodiments, the cloud computing platform 10 (FIG. 1) dynamically assigns multiple sessions for the large presentation or joins the display for one or more portions 410-490 into one session, e.g., one session for each of the portions 410-490 or joining the content delivery for portion 1 410 and portion 2 420 into one session, etc. For each session, the cloud computing platform allocates one instance of the UI application 32 (FIG. 1) and one rendering engine 30 (FIG. 1) for the rendering in accordance with some embodiments. The cloud computing platform also allocates one streamer 50 (FIG. 1) for splitting the images for the large presentation into the multiple portions 410-490.

In some embodiments, when splitting the images, the streamer dynamically adjusts the quality of the portions 410-490. The adjustment allows some displays to differ in quality from others. For instance, portion 1 410 and portion 2 420 can be encoded to have the same resolution and/or bitrate, which can be different from portion 3 430. Likewise, portions 4 through 9 440-490 can be encoded according to a different bitrate from portion 3 430. The difference allows each client device to decode the best quality it can handle regardless of the others. In the case of one client device having issues with downloading and/or decoding, e.g., based on the buffer status reported by the client device for portion 3 430, the streamer can dynamically decrease the bitrate for one particular client device without affecting the overall user experience of the large presentation. The dynamic adjustment by the streamer is also advantageous in embodiments where duplicated content is sent to multiple client devices at different locations, e.g., the same content displayed on display 5 130-5 and display 6 130-6 in FIG. 1. In such embodiments, based on the capabilities of the client devices, multiple display sizes, ratios, resolutions, and/or bitrates can be encoded for the client devices, e.g., the frames for client device 5 120-5 (FIG. 1) are encoded at a different bitrate from the frames for client device 6 120-6 (FIG. 1).

In some embodiments, instead of setting a different bitrate for one client device, the streamer modifies the encoding bitrate for multiple client devices in response to receiving the reports that at least one client device is having issues with downloading and/or decoding. For example, the streamer can lower the bitrate for portions 1 through 9 410-490 to the least common denominator of the bitrates of nine client devices to keep the display quality the same for portions 1 through 9 410-490. In some embodiments, instead of lowering the bitrate for all portions in the large presentation, the stream lowers the bitrate for portions that are in the same session. For example, in FIG. 4, portions 4 through 9 440-490 can be within the same session such that these portions 440-490 are rendered by one instance of a UI application and/or one rendering engine. Based on the buffer status from the client devices corresponding to portions 440-490, the streamer can lower the encoding bitrate for these portions 440-490 to the least common denominator of the six client devices while maintaining the quality for portions 1 through 3 410-430.

In some embodiments, each of the portions 410-490 includes one or more sub-portions that are of different display characteristics from the remainder of a respective portion 430. For example, in FIG. 4, a video displaying a feather spans over portions 4 through 9 440-490 on six different displays. In portion 6 460, a sub-portion corresponding to a menu overlay can have different quality and/or resolution from the remainder of portion 6 460 corresponding to the video across portions 4 through 9 440-490, e.g., a lower resolution for the sub-portion corresponding to the menu overlay relative to the HD quality for the remainder of portion 6 460. Likewise, in portion 9 490, a sub-portion corresponding to the menu overlay can have the same quality and/or resolution from the sub-portion corresponding to the same menu overlay in portion 6 460, but different quality and/or resolution from the remainder of portion 9 490 corresponding to the video across portions 4 through 9 440-490. Decreasing the quality and/or resolution of the sub-portion(s) corresponding to the non-video part of the large screen lowers the overall bitrate of each frame encoded for the portions 410-490, thus improving efficiency while maintaining good user experience.

Figure 5:
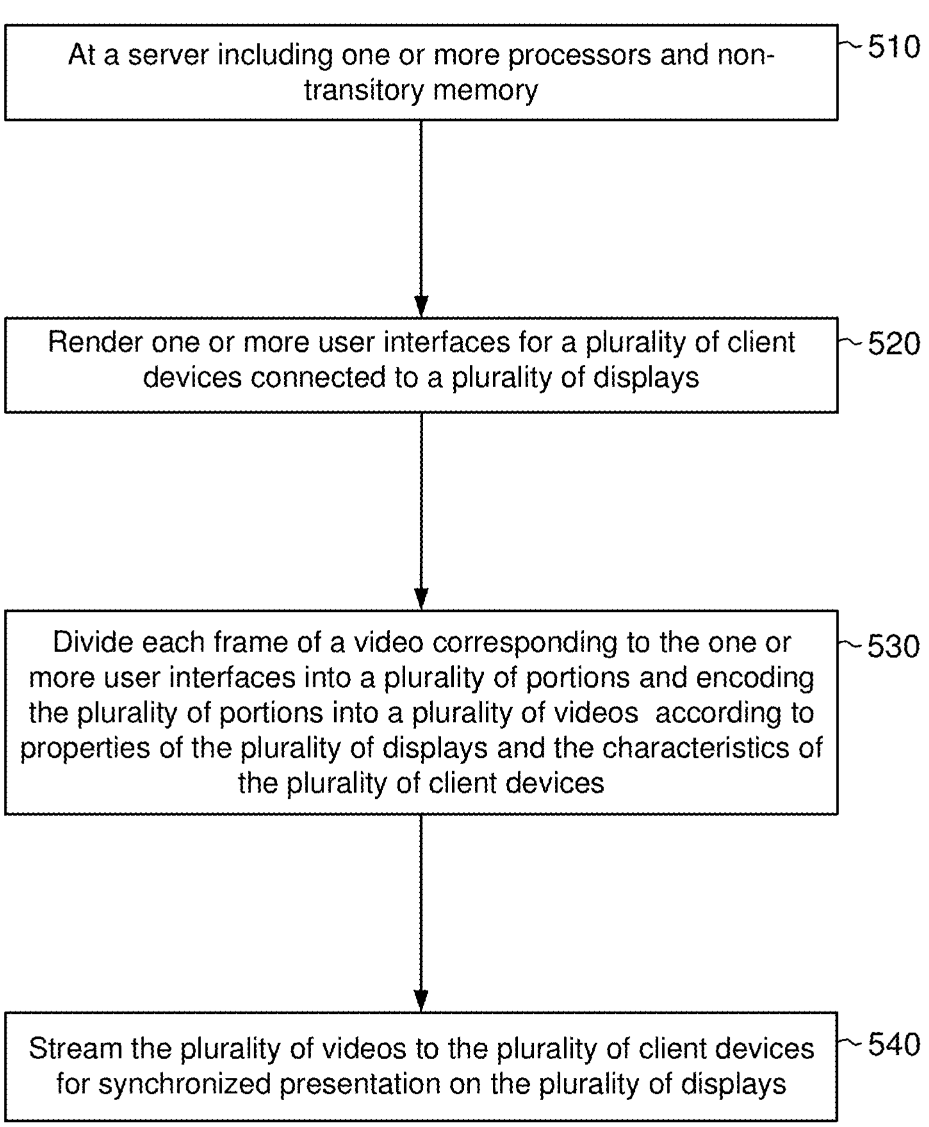
FIG. 5 is a flowchart illustrating a cloud-based video splitting method, in accordance with some embodiments.

FIG. 5 is a flowchart illustrating a method 500 for cloud-based video splitting in accordance with some embodiments. In some embodiments, as represented by block 510, the method 500 is performed at a server that includes one or more processors and non-transitory memory, e.g., the at least one server hosting the cloud computing platform 10 (FIG. 1). In some embodiments, the server is located in a core network, distributed between a core network and an edge device, or on an edge device. As represented by block 520, the method 500 includes rendering one or more user interfaces for a plurality of client devices connected to a plurality of displays.

For example, one of a plurality of client devices, such as a main end receiving device daisy chained with an array of receiving devices, can send a request for a UI video. In some embodiments, the request indicates properties of a plurality of displays connected to the plurality of client devices and characteristics of the plurality of client devices. In some embodiments, the request is initiated at the beginning of a session and the remainder of the session is a real time stream to the client device (e.g., through push method and/or via RTP protocol) that has the relevant content for the client device. In this initial request, in addition to sending the display properties of the display (e.g., metadata from DisplayID in Video Electronics Standards Association (VESA) standard, display refresh rate, dimensions, orientation, resolution, etc.), the client device also passes characteristics about itself, such as the buffer conditions, the network conditions, the identification of the client device, etc. The actual setup of the client devices (e.g., the correlation between the location of the client device and which video stream it receives) does not have to be known to the client device and can be maintained as a configuration in the cloud. In some embodiments, instead of rendering the UIs in response to a request from one of the plurality of client devices, the UIs are rendered, encoded, and pushed to the client side, e.g., in broadcast. In such embodiments, the UIs are encoded based on the properties of the plurality of displays and the characteristics of the plurality of client devices obtained and/or maintained by the cloud.

As represented by block 530, the method 500 includes dividing each frame of a video corresponding to the one or more user interfaces into a plurality of portions and encoding the plurality of portions into a plurality of videos according to properties of the plurality of displays and the characteristics of the plurality of client devices. For example, in FIG. 2, each of the frames in the video 210 is divided into four portions. The top left portion is encoded into video stream 220-1, the top right portion is encoded into video stream 220-2, the bottom left portion is encoded into video stream 220-3, and the bottom right portion is encoded into video stream 220-4. In FIG. 4, each frame corresponding to a large presentation is divided into nine portions. In another example, in FIG. 1, each frame of the video is dividing into one portion for client device 5 120-5 and 120-6 and each portion is encoded into different display qualities based on the properties of display 5 130-5 and display 6 130-6 as well as capabilities of client device 5 120-5 and client device 6 120-6.

As represented by block 540, the method 500 includes streaming the plurality of videos to the plurality of client devices for synchronized presentation on the plurality of displays. For example, in FIG. 2, the streamer 50 stores the videos 220 in the buffer 60 to compensate for the encoding differences and/or introduces delays to the transmission of the videos 220 for synchronized streaming, which results in synchronized presentation on the displays connected to the client devices 120. In another example, in FIG. 3, the client devices 120 are configured to synchronize the clocks 330 to the global time from the time server 70 for synchronized decoding and/or presentation of the content. In yet another example, in FIG. 3, for synchronized downloading, the streamer 50 sends freeze commands to the client devices 120 to freeze or skip on a specific frame until the client devices 120 complete the download of the specific frame to the buffers 340. As a result, the presentations on the displays 130 are synchronized. In still another example, in FIG. 2, the streamer 50 can instruct the client devices 120 to align the decoding of the videos 220 based on the corresponding audio timestamps from the audio streams 222 for synchronized decoding and/or presentation. In some embodiments, as described above with reference to FIG. 3, each of the client devices reports to the cloud computing platform the presentation timestamp of the frame being displayed, e.g., at the start of playing the streaming or periodically. In such embodiments, the cloud computing platform facilitates the synchronization by adjusting the presentation timestamps of subsequent frames according to deltas between the deltas of the reported presentation timestamps among different client devices in accordance with various embodiments. In some embodiments, the cloud computing platform facilitates the synchronization by allowing the client devices to receive the deltas and adjust the presentation timestamps on the client side so that the presentation on the displays connected to the client devices are synchronized.

Figure 6:
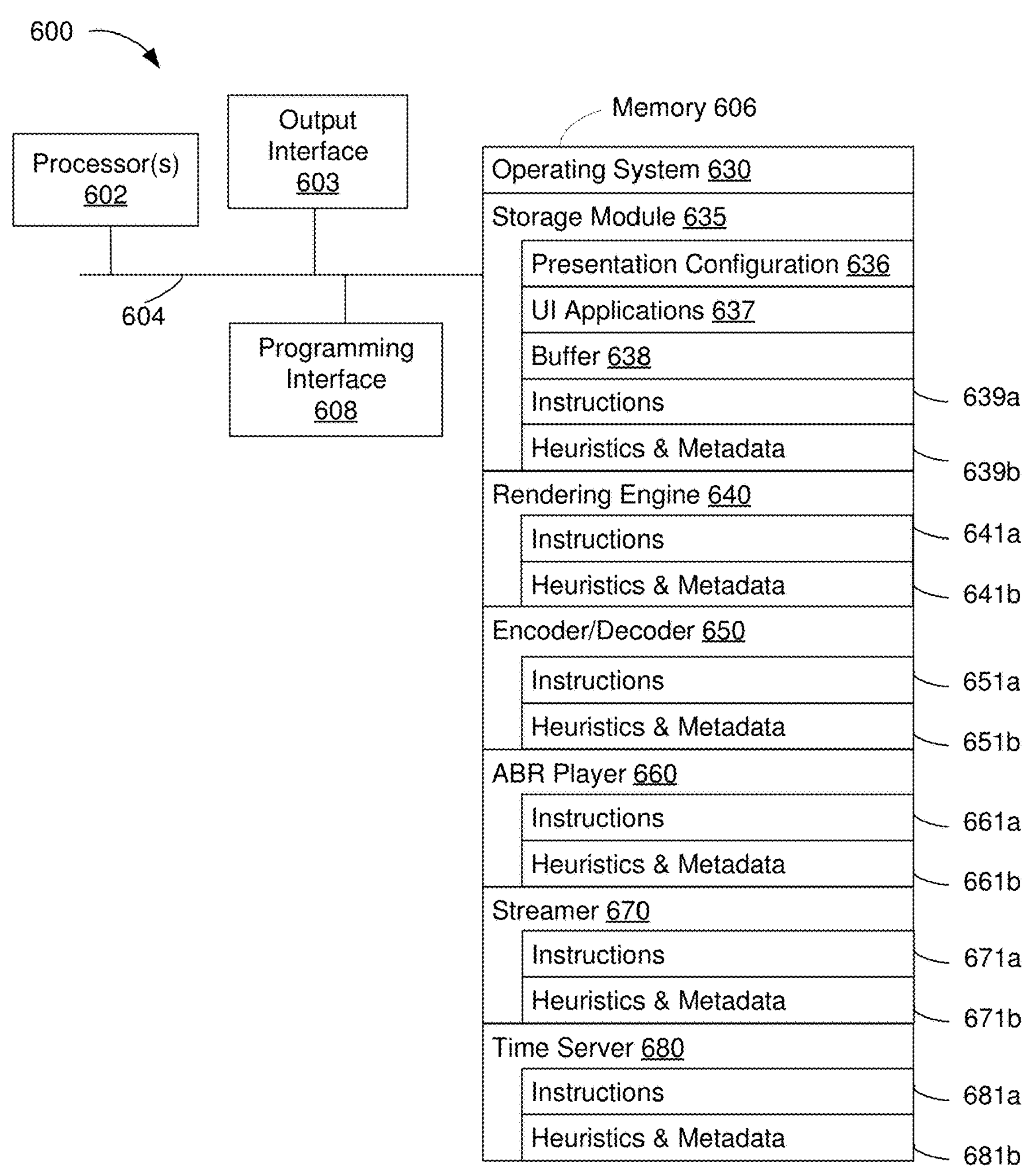
FIG. 6 is a block diagram of a computing device for cloud-based video splitting, in accordance with some embodiments.

FIG. 6 is a block diagram of a computing device 600 for cloud-based video splitting in accordance with some embodiments. In some embodiments, the computing device 600 corresponds to the one or more servers hosting the cloud computing platform 10 and performs one or more of the cloud-based video splitting functionalities described above performed by the signaling unit 20, the encoder/decoder 34, the rendering engine 30, the streamer 50, the ABR player 40, and the time server 70 with reference to FIGS. 1-3. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units 602 (e.g., CPU(s)/GPU(s)), one or more output interfaces 603 (e.g., a network interface for connecting with another computing device), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 635, a rendering engine 640, an encoder/decoder 650, an ABR player 660, a streamer 670, and a time server 680. In some embodiments, one or more instructions are included in a combination of logic and non-transitory memory. The operating system 630 includes procedures for handling various basic system services and for performing hardware dependent tasks.

In some embodiments, the storage module 635 is configured to store and/or manage presentation configuration 636 (e.g., the correlation between the location of the client device and which video stream it receives in a large presentation), UI applications 637 (e.g., the UI applications 32 in FIG. 1 for generating and/or rendering UIs), and a buffer 638 (e.g., the buffer 60 in FIGS. 1 and 2 for storing videos from the streamer 50 prior to the transmission of synchronized videos). To that end, the storage module 635 includes a set of instructions 639*a* and heuristics and metadata 639*b*.

In some embodiments, the rendering engine 640 (e.g., the rendering engine 30, FIG. 1) is configured to render UIs in the cloud for client devices. To that end, the rendering engine 640 includes a set of instructions 641*a* and heuristics and metadata 641*b*.

In some embodiments, the encoder/decoder 650 (e.g., the encoder/decoder 34, FIG. 1) re-encodes and/or re-encrypts video content for UI composition and/or rendering and/or encoding rendered UIs into low latency videos. To that end, the encoder/decoder includes a set of instructions 651*a* and heuristics and metadata 651*b*.

In some embodiments, the ABR player 660 (e.g., the ABR player 40, FIG. 1) obtains and plays ABR videos to the rendering engine 640 for UI composition and/or rendering. To that end, the ABR player 660 includes a set of instructions 661*a* and heuristics and metadata 661*b*.

In some embodiments, the streamer 670 (e.g., the streamer 40, FIGS. 1-3) obtains the rendered and/or encoded UIs and/or ABR videos and splits the videos for client devices in a large presentation. To that end, the streamer 670 includes a set of instructions 671*a* and heuristics and metadata 671*b*.

In some embodiments, the time server 680 (e.g., the time server 70 in FIGS. 1 and 3) is configured to provide global time, determine whether the streams for the large presentation are out of sync, and/or provide deltas of PTS among client devices to facilitate synchronization. To that end, the time server 680 includes a set of instructions 681*a* and heuristics and metadata 681*b*.

Although the storage module 635, the rendering engine 640, the encoder/decoder 650, the ABR player 660, the streamer 670, and the time server 680 are illustrated as residing on a single computing device 600, it should be understood that in other embodiments, any combination of the storage module 635, the rendering engine 640, the encoder/decoder 650, the ABR player 660, the streamer 670, and the time server 680 can reside in separate computing devices in various embodiments. For example, in some embodiments, each of the storage module 635, the rendering engine 640, the encoder/decoder 650, the ABR player 660, the streamer 670, and the time server 680 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at a server including one or more processors and non-transitory memory:

rendering one or more user interfaces for a plurality of client devices connected to a plurality of displays;

dividing each frame of a video corresponding to the one or more user interfaces into a plurality of portions and encoding the plurality of portions into a plurality of videos according to properties of the plurality of displays and characteristics of the plurality of client devices;

streaming the plurality of videos to the plurality of client devices for synchronized presentation on the plurality of displays; and facilitating modification of presentation timestamps of frames subsequent the frames being presented based on deltas of frames being presented at the plurality of client devices.

2. The method of claim 1, wherein streaming the plurality of videos to the plurality of client devices for synchronized presentation on the plurality of displays includes:

configuring the plurality of client devices to same amount of buffering; and causing the plurality of client devices to send a respective frame of the plurality of videos to the plurality of displays at same time.

3. The method of claim 1, wherein the synchronized presentation on the plurality of displays includes synchronized presentation timestamps of the plurality of portions, and the method further includes:

causing the plurality of client devices to synchronize presentation timestamps for the plurality of videos according to a global time correlating to a respective frame of the plurality of videos.

4. The method of claim 1, wherein streaming the plurality of videos to the plurality of client devices for synchronized presentation on the plurality of displays includes:

synchronizing timestamps of corresponding frames in the plurality of videos; and sending the plurality of videos to the plurality of client devices at same time.

5. The method of claim 1, wherein streaming the plurality of videos to the plurality of client devices for synchronized presentation on the plurality of displays includes:

buffering corresponding frames in the plurality of videos prior to transmitting the plurality of videos to the plurality of client devices; and transmitting the buffered corresponding frames at same time.

6. The method of claim 1, wherein streaming the plurality of videos to the plurality of client devices for synchronized presentation on the plurality of displays includes:

synchronizing a plurality of audio streams corresponding to the plurality of videos; and instructing the plurality of client devices to align decoding of the plurality of videos based on corresponding audio timestamps in the plurality of audio streams.

7. The method of claim 1, wherein dividing each frame of the video into the plurality of portions and encoding the plurality of portions into the plurality of videos according to the properties of the plurality of displays and the characteristics of the plurality of client devices includes:

obtaining buffer conditions from the characteristics, including bitrates associated with the plurality of client devices;

deriving a least common denominator from the bitrates; and encoding a respective frame of the plurality of videos according to the least common denominator.

8. The method of claim 1, wherein encoding the plurality of portions into the plurality of videos includes:

encoding a first portion of the plurality of portions according to a first resolution; and encoding a second portion of the plurality of portions at a second resolution, different from the first resolution.

9. The method of claim 1, further comprising:

sending messages to the plurality of client devices to align to a particular frame in the plurality of videos, wherein the messages instruct the plurality of client devices to freeze or skip; and instructing the plurality of client devices to resume presenting the plurality of videos upon the plurality of client devices completing downloading of the particular frame.

10. The method of claim 1, further comprising:

establishing a plurality of sessions for streaming of the plurality of videos to the plurality of client devices; and assigning a plurality of applications to the plurality of sessions, wherein the synchronizing is performed across the plurality of sessions.

11. The method of claim 1, wherein:

encoding each frame of the video into the plurality of portions includes duplicating each frame into the plurality of portions; and the method further includes distributing the plurality of videos to the plurality of client devices at different locations.

12. The method of claim 1, further comprising:

configuring the plurality of client devices to wait for a respective display signaling completion of drawing a current frame before sending a next frame.

13. A non-transitory memory storing one or more programs, which, when executed by a server with one or more processors, cause the server to:

render one or more user interfaces for a plurality of client devices connected to a plurality of displays;

divide each frame of a video corresponding to the one or more user interfaces into a plurality of portions and encode the plurality of portions into a plurality of videos according to the properties of the plurality of displays and characteristics of the plurality of client devices;

stream the plurality of videos to the plurality of client devices for synchronized presentation on the plurality of displays;

send messages to the plurality of client devices to align to a particular frame in the plurality of videos, wherein the messages instruct the plurality of client devices to freeze or skip; and instruct the plurality of client devices to resume presenting the plurality of videos upon the plurality of client devices completing downloading of the particular frame.

14. The non-transitory memory of claim 13, wherein streaming the plurality of videos to the plurality of client devices for synchronized presentation on the plurality of displays includes:

configuring the plurality of client devices to same amount of buffering; and causing the plurality of client devices to send a respective frame of the video to the plurality of displays at same time.

15. The non-transitory memory of claim 13, wherein the synchronized presentation on the plurality of displays includes synchronized presentation timestamps of the plurality of portions, and the one or more programs, which, when executed by the server with the one or more processors, further cause the server to:

cause the plurality of client devices to synchronize presentation timestamps for the plurality of videos according to a global time correlating to a respective frame of the plurality of videos.

16. The non-transitory memory of claim 13, wherein streaming the plurality of videos to the plurality of client devices for synchronized presentation on the plurality of displays includes:

configuring the plurality of client devices to synchronize to a global time; and sending the plurality of videos to the plurality of client devices at same time according to the global time.

17. The non-transitory memory of claim 13, wherein streaming the plurality of videos to the plurality of client devices for synchronized presentation on the plurality of displays includes:

buffering corresponding frames in the plurality of videos prior to transmitting the plurality of videos to the plurality of client devices; and transmitting the buffered corresponding frames at same time.

18. The non-transitory memory of claim 13, wherein dividing each frame of the video into the plurality of portions and encoding the plurality of portions into the plurality of videos according to the properties of the plurality of displays and the characteristics of the plurality of client devices includes:

obtaining buffer conditions from the characteristics, including bitrates associated with the plurality of client devices;

deriving a least common denominator from the bitrates; and encoding a respective frame of the plurality of videos according to the least common denominator.

19. A server comprising:

one or more processors;

a non-transitory memory;

a network interface; and one or more programs, stored in the non-transitory memory, which, when executed by the one or more processors, cause the server to:

render one or more user interfaces for a plurality of client devices connected to a plurality of displays;

divide each frame of a video corresponding to the one or more user interfaces into a plurality of portions and encode the plurality of portions into a plurality of videos according to the properties of the plurality of displays and characteristics of the plurality of client devices;

streaming the plurality of videos to the plurality of client devices for synchronized presentation on the plurality of displays;

establishing a plurality of sessions for streaming of the plurality of videos to the plurality of client devices; and assigning one or more instances of an application to the plurality of sessions, wherein the synchronizing is performed across the plurality of sessions.

* * * * *